(12) United States Patent
Chu et al.

(10) Patent No.: US 11,362,323 B2
(45) Date of Patent: Jun. 14, 2022

(54) METHOD FOR PREPARING REFERENCE ELECTRODE AND LITHIUM ION BATTERY WITH REFERENCE ELECTRODE

(71) Applicant: TSINGHUA UNIVERSITY, Beijing (CN)

(72) Inventors: Zhengyu Chu, Beijing (CN); Nan Pu, Beijing (CN); Xuning Feng, Beijing (CN); Languang Lu, Beijing (CN); Jianqiu Li, Beijing (CN); Minggao Ouyang, Beijing (CN)

(73) Assignee: Tsinghua University, Beijing (CN)

( * ) Notice: Subject to any disclaimer, the term of this patent is extended or adjusted under 35 U.S.C. 154(b) by 68 days.

(21) Appl. No.: 16/641,952

(22) PCT Filed: Nov. 8, 2018

(86) PCT No.: PCT/CN2018/114516
§ 371 (c)(1),
(2) Date: Feb. 25, 2020

(87) PCT Pub. No.: WO2019/096053
PCT Pub. Date: May 23, 2019

(65) Prior Publication Data
US 2021/0135322 A1    May 6, 2021

(30) Foreign Application Priority Data
Nov. 17, 2017   (CN) .......................... 201711143955.2

(51) Int. Cl.
*H01M 4/1395*   (2010.01)
*H01M 4/38*     (2006.01)
(Continued)

(52) U.S. Cl.
CPC ........ *H01M 4/1395* (2013.01); *G01N 27/301* (2013.01); *H01M 4/0402* (2013.01);
(Continued)

(58) Field of Classification Search
CPC ............. H01M 4/1395; H01M 4/0402; H01M 50/528; H01M 50/569; H01M 50/417;
(Continued)

(56) References Cited

U.S. PATENT DOCUMENTS 4,738,716 A * 4/1988 Roumieu .................. C22B 9/04
75/589
8,679,677 B1 * 3/2014 Tamaki ............. H01M 10/0585
429/209

(Continued)

FOREIGN PATENT DOCUMENTS

CN    201904414 U    7/2011
CN    203150666 U    8/2013
(Continued)

OTHER PUBLICATIONS

Machine translation of CN-106785068-A (original foreign document cited and attached within the IDS dated Feb. 2, 2021), "A kind of three electrode soft-package batteries and preparation method thereof" (Year: 2017).*

(Continued)

*Primary Examiner* — William E McClain
*Assistant Examiner* — Jessie L. Walls
(74) *Attorney, Agent, or Firm* — Avek IP, LLC

(57) ABSTRACT

A method for preparing a reference electrode and a lithium ion battery with a reference electrode. In some embodiments, a method includes the following steps: welding a reference electrode substrate to a lower portion of a current collector metal sheet with a tab-film; melting metal lithium into a liquid state; immersing a lower portion of the reference electrode substrate welded with the current collector metal sheet into the liquid lithium; coating a lower portion of the tab-film with a layer of separator to obtain a reference electrode with a separator coating; inserting the reference (Continued)

electrode between a separator of a core of a lithium ion battery and an anode piece; and packaging in plastic the lithium ion battery implanted with the reference electrode to obtain the lithium ion battery with the reference electrode.

19 Claims, 10 Drawing Sheets

(51) Int. Cl.

| | | |
|---|---|---|
| *H01M 4/66* | (2006.01) | |
| *H01M 50/528* | (2021.01) | |
| *H01M 50/569* | (2021.01) | |
| *G01N 27/30* | (2006.01) | |
| *H01M 4/04* | (2006.01) | |
| *H01M 4/74* | (2006.01) | |
| *H01M 10/42* | (2006.01) | |
| *H01M 10/0525* | (2010.01) | |
| *H01M 50/446* | (2021.01) | |
| *H01M 50/417* | (2021.01) | |
| *H01M 10/058* | (2010.01) | |
| *H01M 4/02* | (2006.01) | |

(52) U.S. Cl.
CPC ......... *H01M 4/0404* (2013.01); *H01M 4/382* (2013.01); *H01M 4/661* (2013.01); *H01M 4/74* (2013.01); *H01M 10/058* (2013.01); *H01M 10/0525* (2013.01); *H01M 50/417* (2021.01); *H01M 50/446* (2021.01); *H01M 50/528* (2021.01); *H01M 50/569* (2021.01); *H01M 10/4285* (2013.01); *H01M 2004/021* (2013.01)

(58) Field of Classification Search
CPC ............. H01M 4/0404; H01M 10/058; H01M 50/446; H01M 4/382; H01M 4/661; H01M 10/0525; H01M 10/4285; H01M 2004/021; H01M 50/124; H01M 4/74; G01N 27/301; Y02P 70/50; Y02E 60/10
See application file for complete search history.

(56) References Cited

U.S. PATENT DOCUMENTS

| | | | |
|---|---|---|---|
| 2012/0027926 A1 | 2/2012 | Miyuki | |
| 2016/0276651 A1* | 9/2016 | Choi | ................... H01M 4/0416 |
| 2016/0308260 A1 | 10/2016 | Yu | |
| 2018/0205049 A1* | 7/2018 | Min | ...................... H01M 4/134 |
| 2021/0126239 A1* | 4/2021 | Choi | ....................... H01M 4/12 |

FOREIGN PATENT DOCUMENTS

| | | |
|---|---|---|
| CN | 105308786 A | 2/2016 |
| CN | 106784635 A | 5/2017 |
| CN | 106785068 A | 5/2017 |
| CN | 108107092 A | 6/2018 |
| CN | 207530063 U | 6/2018 |
| EP | 1577914 A1 | 9/2005 |
| JP | 2013191532 A | 9/2013 |
| KR | 20150005085 A | 1/2015 |

OTHER PUBLICATIONS

What when how, "Hot-dip coatings", <https://what-when-how.com/materialsparts-and-finishes/hot-dip-coatings/> (Year: 2017).*
"How to Clean Copper Packing Material", Clawhammer Supply, Feb. 9, 2016, <https://www.clawhammersupply.com/blogs/moonshine-still-blog/85088708-how-to-clean-copper-packing-material> (Year: 2016).*
Dilip Parikh, DPharma Group, "Vacuum Drying: Basics and Application", Chemical Engineering—New York—McGraw Hill Incorporated, Apr. 2015, pp. 48-54 (Year: 2015).*
Shang-Sen Chi, Yongchang Liu, Wei-Li Song, Li-Zhen Fan, and Qiang Zhang; "Prestoring Lithium into Stable 3D Nickel Foam Host as Dendrite-Free Lithium Metal Anode", Adv. Funct. Mater. 2017, 27, 1700348. (Year: 2017).*
Jalin Mao, "Fabrication of Lithium-Ion Battery With Vertically Aligned Carbon Nanotubes on Three-Dimensional NI Foam", University of Akron. (Year: 2014).*
International Search Report and Written Opinion dated Jan. 30, 2019 issued in PCT/CN2018/114516.
J. Zhou et al, Development of Reliable Lithium Microreference Electrodes for Long-Term In Situ Studies of Lithium-Based Battery Systems, Journal of The Electrochemical Society, 151 (12) A2173-A2179 (2004).

* cited by examiner

S110 — Use porous foamed copper, foamed nickel, reticulated copper or reticulated nickel as a reference electrode substrate, where the aperture of the reference electrode substrate is 50-500 μm, the thickness of the reference electrode substrate is 0.1-1 mm, and the area of the reference electrode substrate is 1%-10% that of an electrode piece of a lithium ion battery; clean the reference electrode substrate with acetone or deionized water, and then air the reference electrode substrate for later use.

S120 — Weld the reference electrode substrate obtained in step S110 to a lower portion of a current collector metal sheet with a tab-film adhering to an upper portion thereof, so that an upper portion of the reference electrode substrate and the lower portion of the current collector metal sheet overlap each other, where the area of the current collector metal sheet is smaller than that of the reference electrode substrate; dry the reference electrode under vacuum at 60-90°C for 4-7 h in an anhydrous and oxygen-free environment, and after drying and cooling, transfer the reference electrode to an anhydrous and oxygen-free environment for storage, where the current collector metal sheet is required for acquiring a current, the material of the current collector metal sheet is nickel or aluminum, and the current collector metal sheet has a thickness of 0.1-1 mm and a length of 10-30 mm S130 — Melt metal lithium into a liquid state in an anhydrous and oxygen-free environment, and continuously heat the metal lithium to 200-500°C to remove impurities on the surface of the liquid metal lithium; immerse a lower portion of the reference electrode substrate with the current collector metal sheet welded to the upper portion thereof in step S120 into the liquid lithium and stand for 1-5 min, so that the lower portion of the reference electrode substrate is coated with a metal lithium layer, where the metal lithium has a thickness of 10-100 μm; take out the reference electrode for cooling, and coat a lower portion of the tab-film with a layer of separator by using a winding method to tightly wrap the whole current collector metal sheet and the whole reference electrode substrate to obtain the reference electrode with a separator coating, where the separator material is porous polypropylene or porous polyethylene, porous polypropylene with ceramic coating or polyethylene or a non-woven fabric (S110, S120, S130 comprise S100)

S200 — Insert the reference electrode prepared in step S100 between a separator of a core of the lithium ion battery and an anode piece in an anhydrous and oxygen-free environment, so that the upper end of the reference electrode is exposed from the core of the lithium ion battery by 1-2 mm S300 — Package in plastic the lithium ion battery implanted with the reference electrode in step S200 by using an aluminum-plastic film under anhydrous and oxygen-free conditions to obtain the lithium ion battery with the reference electrode

FIG. 9

METHOD FOR PREPARING REFERENCE ELECTRODE AND LITHIUM ION BATTERY WITH REFERENCE ELECTRODE

CROSS REFERENCE TO RELATED APPLICATIONS

This application is the United States national stage entry under 35 U.S.C. 371 of PCT/CN2018/114516 filed on Nov. 8, 2018, which claims priority to Chinese application number 201711143955.2, filed on Nov. 17, 2017, the disclosure of which are incorporated by reference herein in their entireties.

FIELD OF THE DISCLOSURE

The disclosure relates generally to the field of electrode potential detection and electrode manufacturing. More specifically, the disclosure relates a method for preparing a reference electrode and a lithium ion battery with a reference electrode.

BACKGROUND

Electrode potential is a very important parameter in electrochemistry and battery research technology. The electrode potential in a thermodynamic equilibrium state is an open circuit potential. In practical application, a voltage-SOC curve obtained by small current charging and discharging can be approximately considered as an open circuit voltage curve of a battery. If a current flows through an electrode, the electrode is polarized and the electrode potential shifts due to the generation of an overpotential. By measuring a potential variation curve of a single electrode, detailed information of the internal reaction of the electrode can be obtained. For example, for a lithium ion battery with a graphitic anode, overcharge or low-temperature charging may cause lithium precipitation side reaction of the graphitic anode, which is characterized in that the electrode potential of the anode is lower than a balance voltage of lithium precipitation reaction, so the lithium precipitation side reaction can be detected through the electrode potential. However, each battery is composed of two electrodes, and the polarization characteristics of a single electrode cannot be directly obtained. The measurement must be carried out by a multi-electrode system, that is, one or more reference electrodes are added between a cathode and an anode, and a relative voltage difference between the electrode and the reference electrode is measured. In related technologies, the preparation of the reference electrode is performed mainly by chemical plating, lithium foil, lithium alloys, lithium-containing metal oxides or lithium-containing metal phosphates, and other solutions.

In 2004, a report entitled "Development of reliable lithium Micro-reference electrodes for long-term in-situ observation based on lithium battery systems" (DOI: 10.6100/IR 624713) was published in the Journal of the Electrochemical Society, and a lithium reference electrode was obtained by inserting micron-sized copper wire into the battery and then performing double-sided electroplating. The method can reduce the barrier to lithium ion circulation as far as possible, but due to the use of a too small reference electrode, according to the method, there is less lithium load on the reference electrode, an uneven coating is prone to occur, and potential drift may occur after long-term measurement, which is difficult to apply to durability research, and the requirements for input impedance of measuring instruments are high.

Another method is to directly insert lithium metal foil into the battery. Metal lithium is generally connected to a current collector by physical crimping. According to literature research, in a study entitled "Self-Discharge of LiMn2O4/C Li-Ion Cells in Their Discharged State" (J. Electronchem. SOC., Vol. 145, No. 1, 1998), researchers used physical methods, namely methods of crimping and the like, to connect lithium to current collectors such as a copper mesh. In this method, the copper mesh has a large pore size, which is mm-sized. However, this physical connection method is difficult to ensure that the connection between lithium and copper is firm. If the contact is poor, it easily leads to extremely high ohmic resistance of the reference electrode, which affects the use of the reference electrode.

In summary, in related technologies, one of the difficulties in developing the reference electrode is caused by the lithium content of the electrode: in order to reduce the blocking effect of lithium ions in reference electrolyte, the size of the reference electrode should be reduced as much as possible, but this results in a smaller overall lithium content of the material and a weak signal, and the electrode loss or potential drift is easily caused by measurement of a micro-current.

SUMMARY

The following presents a simplified summary of the invention in order to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

In some embodiments, the disclosure provides a method for preparing a reference electrode including the following steps: (S11) cleaning and drying a reference electrode substrate; (S12) welding the reference electrode substrate to a lower portion of a current collector metal sheet with a tab-film adhering to an upper portion; (S13) melting metal lithium into a liquid state in an anhydrous and oxygen-free environment, and continuously heating the liquid metal lithium to remove surface impurities; (S14) immersing a lower portion of the reference electrode substrate welded with the current collector metal sheet into the liquid lithium and keeping the reference electrode substrate standing, so that the lower portion of the reference electrode substrate is coated with a metal lithium layer; and (S15) taking out the reference electrode welded with the current collector metal sheet from the liquid lithium, cooling the reference electrode, and coating a lower portion of the tab-film with a layer of separator by a winding method to obtain a reference electrode with a separator coating.

In other embodiments, the disclosure provides a method for preparing a lithium ion battery with a reference electrode including the following steps: (S10) preparing a reference electrode; (S20) inserting the reference electrode between a separator of a core of a lithium ion battery and an anode piece in an anhydrous and oxygen-free environment, so that an upper end of the reference electrode is exposed from the core of the lithium ion battery; and (S30) packaging the lithium ion battery implanted with the reference electrode under anhydrous and oxygen-free conditions to obtain the lithium ion battery with the reference electrode.

The (S10) step includes the following steps: (S11) cleaning and drying a reference electrode substrate; (S12) welding the reference electrode substrate to a lower portion of a current collector metal sheet with a tab-film adhering to an upper portion; (S13) melting metal lithium into a liquid state in an anhydrous and oxygen-free environment, and continuously heating the liquid metal lithium to remove surface impurities; (S14) immersing a lower portion of the reference electrode substrate welded with the current collector metal sheet into the liquid lithium and keeping the reference electrode substrate standing, so that the lower portion of the reference electrode substrate is coated with the metal lithium layer; and (S15) taking out the reference electrode welded with the current collector metal sheet from the liquid lithium, cooling the reference electrode, and coating a lower portion of the tab-film with a layer of separator by a winding method to obtain the reference electrode with a separator coating.

In further embodiments, the disclosure provides a method for preparing a lithium ion battery with a reference electrode including the following steps: (S100) preparing a reference electrode; (S200) inserting the reference electrode prepared in step (S100) between a separator of a core of a lithium ion battery and an anode piece in an anhydrous and oxygen-free environment, so that an upper end of the reference electrode is exposed from the core of the lithium ion battery by 1-2 mm; and (S300) packaging in plastic the lithium ion battery implanted with the reference electrode in step (S200) by an aluminum-plastic film under anhydrous and oxygen-free conditions to obtain the lithium ion battery with the reference electrode.

The (S100) step include the following steps: (S110) using porous foamed copper, foamed nickel, reticulated copper, or reticulated nickel as a substrate of a reference electrode, cleaning the reference electrode substrate with acetone or deionized water, and then airing the reference electrode substrate for later use; (S120) welding the reference electrode substrate obtained in step (S110) to a lower portion of a current collector metal sheet with a tab-film adhering to an upper portion, so that an upper portion of the reference electrode substrate and the lower portion of the current collector metal sheet overlap each other, drying and cooling the reference electrode in an anhydrous and oxygen-free environment, and then transferring the reference electrode to an anhydrous and oxygen-free environment for storage; and (S130) melting metal lithium into a liquid state in an anhydrous and oxygen-free environment, continuously heating the metal lithium to 200-500° C. to remove surface impurities of the liquid metal lithium, immersing a lower portion of the reference electrode substrate with the current collector metal sheet welded to the upper portion in step (120) into the liquid lithium, and keeping the reference electrode substrate standing for 1-5 min, so that the lower portion of the reference electrode substrate is coated with a metal lithium layer, taking out the reference electrode for cooling, and coating a lower portion of the tab-film with a layer of separator by a winding method to wrap the whole current collector metal sheet and the whole reference electrode substrate to obtain the reference electrode with a separator coating.

In step (S110), the pore size of the reference electrode substrate material is 50-500 μm, the reference electrode substrate has a thickness of 0.1-1 mm, and the area of the reference electrode substrate is 1-10% that of an electrode piece of a lithium ion battery.

In step (S120), the area of the current collector metal sheet is smaller than that of the reference electrode substrate, and the current collector metal sheet is required for acquiring a current. The current collector metal sheet is made of nickel or aluminum, and has a thickness of 0.1-1 mm and a length of 10-30 mm.

In step (S130), the metal lithium has a thickness of 10-100 μm. The separator is made of porous polypropylene, porous polyethylene, porous polypropylene with a ceramic coating, polyethylene with a ceramic coating, or a non-woven fabric with a ceramic coating.

BRIEF DESCRIPTION OF THE DRAWINGS

Illustrative embodiments of the disclosure are described in detail below with reference to the attached drawing figures.

FIG. 9 shows a flow chart of a further method for preparing a lithium ion battery with a reference electrode in an embodiment of the disclosure.

DETAILED DESCRIPTION

The following describes some non-limiting exemplary embodiments of the invention with reference to the accompanying drawings. The described embodiments are merely a part rather than all of the embodiments of the invention. All other embodiments obtained by a person of ordinary skill in the art based on the embodiments of the disclosure shall fall within the scope of the disclosure.

In FIGS. 1-12, 1 represents Lithium ion battery, 2 represents reference electrode, 3 represents cathode, 4 represents anode, 5 represents tab-film, 6 represents current collector metal sheet, 7 represents reference electrode substrate, 8 represents welding spot, 9 represents metal lithium layer, 10 represents cathode piece, and 11 represents separator between a cathode piece and an anode piece of a lithium ion battery.

Figure 1:
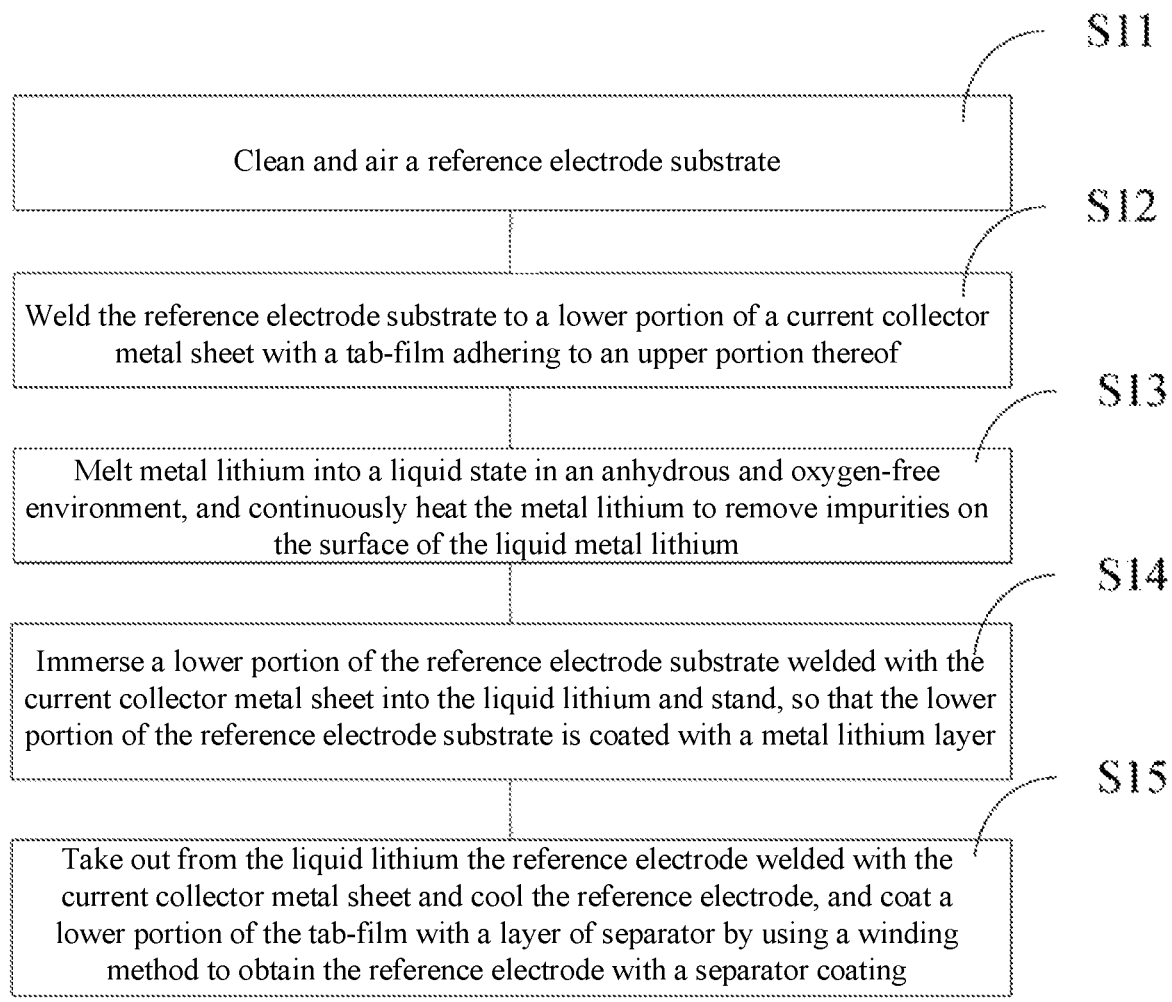
FIG. 1 shows a flow chart of a method for preparing a reference electrode in an embodiment of the disclosure.
Figure 2:
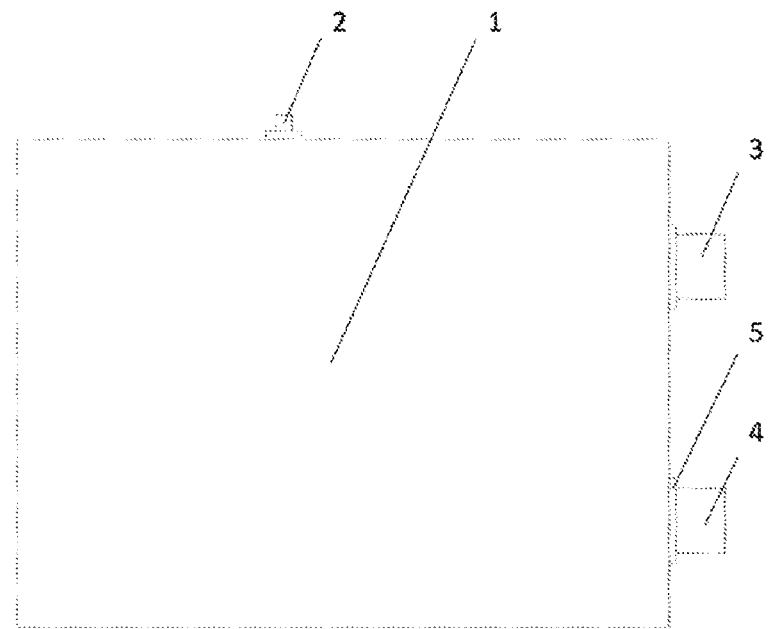
FIG. 2 shows a schematic structural diagram of a lithium ion battery with a reference electrode in an embodiment of the disclosure.
Figure 3:
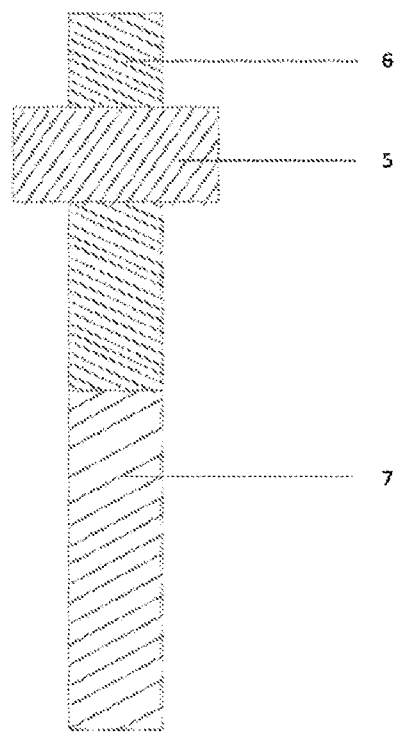
FIG. 3 shows a front view of a reference electrode in an embodiment of the disclosure.

First, referring to FIGS. 1-3, the disclosure provides a method for preparing a reference electrode. The method for preparing a reference electrode may include: (S111) Clean and air a reference electrode substrate. (S112) Weld the reference electrode substrate 7 to a lower portion of a current collector metal sheet 6 with a tab-film 5 adhering to an upper portion thereof. (S113) Melt metal lithium into a liquid state in an anhydrous and oxygen-free environment, and continuously heat the metal lithium to remove surface impurities of the liquid metal lithium. (S114) Immerse a lower portion of the reference electrode substrate 7 welded with the current collector metal sheet 6 into the liquid lithium and stand, so that the lower portion of the reference electrode substrate 7 is coated with a metal lithium layer 9. (S115) Take out the reference electrode 2 welded with the current collector metal sheet 6 from the liquid lithium, cool the reference electrode, and coat a lower portion of the tab-film 5 with a layer of separator by a winding method to obtain a reference electrode 2 with a separator coating.

Figure 4:
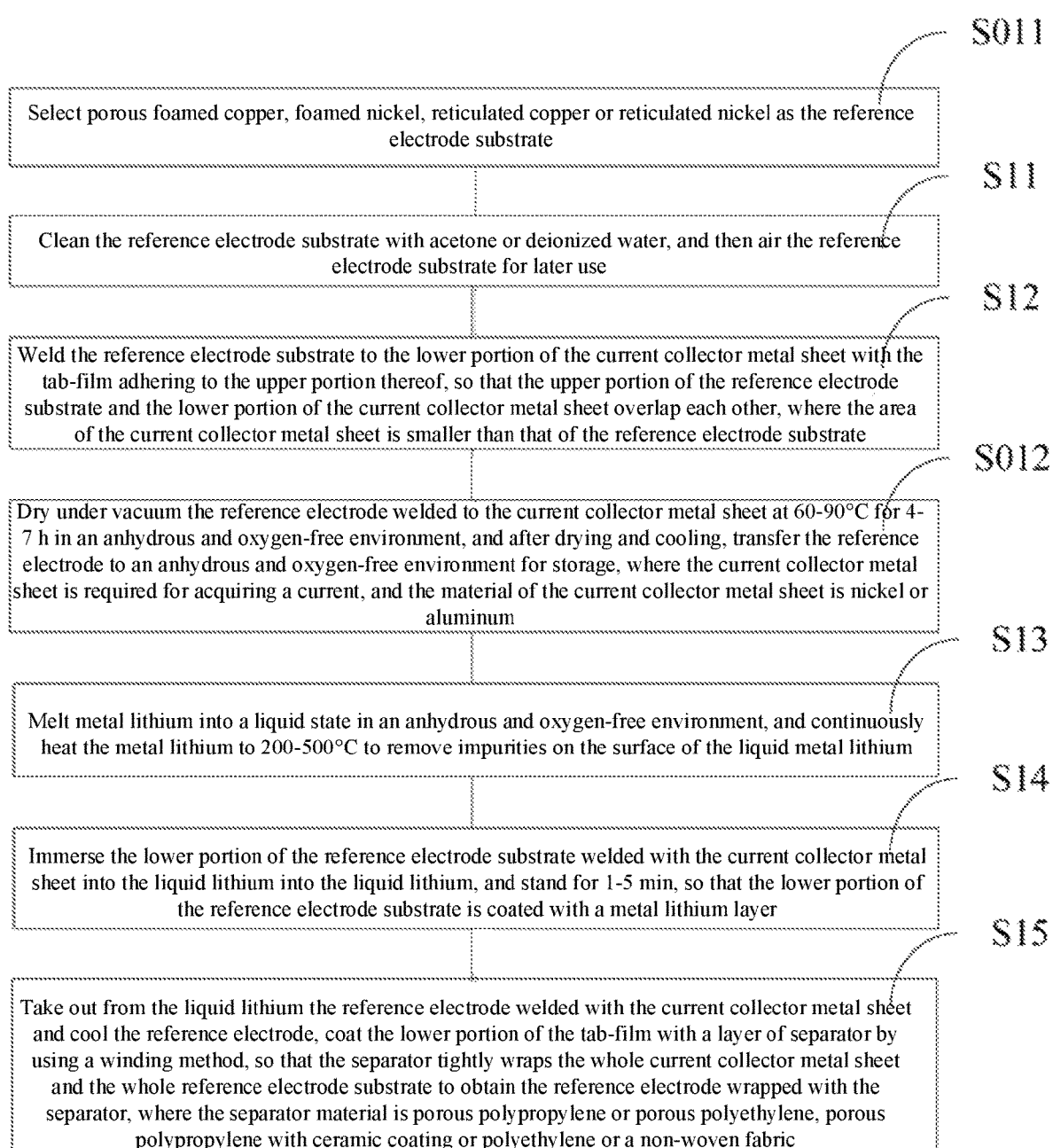
FIG. 4 shows a flow chart of another method for preparing a reference electrode in an embodiment of the disclosure.

Referring to FIG. 4, in an embodiment, prior to step (S411), in step (S4011), porous foamed copper, foamed nickel, reticulated copper, or reticulated nickel is selected as the reference electrode substrate 7. In step (S411), the reference electrode substrate 7 is cleaned with acetone or deionized water, and then aired for later use. In this embodiment, the pore size of the reference electrode substrate 7 may be 50-500 µm, and the reference electrode substrate 7 may have a thickness of 0.1-1 mm.

In an embodiment, in step (S412), the reference electrode substrate 7 is welded to the lower portion of the current collector metal sheet 6 with the tab-film 5 adhering to the upper portion thereof, so that the upper portion of the reference electrode substrate 7 and the lower portion of the current collector metal sheet 6 overlap each other. The area of the current collector metal sheet 6 is smaller than that of the reference electrode substrate 7. After step (S412), in step (S4012), the reference electrode 2 welded to the current collector metal sheet 6 is dried under vacuum at 60-90° C. in an anhydrous and oxygen-free environment for 4-7 h, and after drying and cooling, the reference electrode 2 is transferred to an anhydrous and oxygen-free environment for storage. The current collector metal sheet 6 is required for acquiring a current, and the current collector metal sheet 6 is made of nickel or aluminum. In this embodiment, the current collector metal sheet 6 may have a thickness of 0.1-1 mm, and the length is determined in accordance with the position of the reference electrode 2 relative to the battery, and may be 10-30 mm.

In an embodiment, in step (S413), the metal lithium is molten into a liquid state in an anhydrous and oxygen-free environment, and continuously heated to 200-500° C. to remove surface impurities of the liquid metal lithium.

Figure 5:
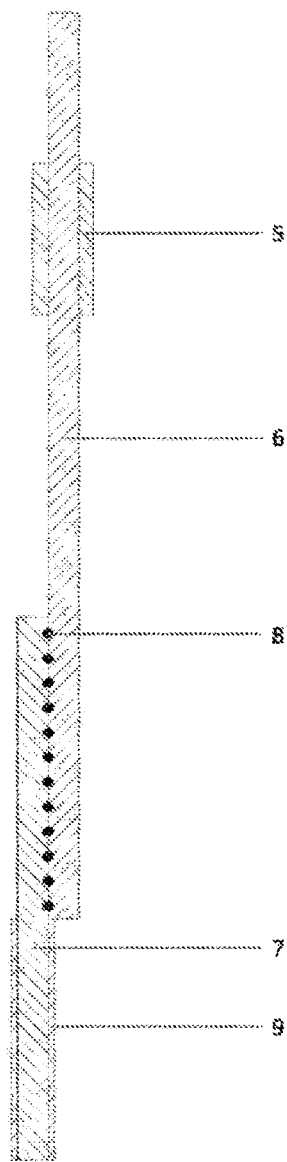
FIG. 5 shows a side view of the reference electrode shown in FIG. 3 in an embodiment of the disclosure.

Referring to FIG. 5, in an embodiment, in step (S414), a lower portion of the reference electrode substrate 7 with the current collector metal sheet 6 welded on an upper portion thereof is immersed into the liquid lithium and stands for 1-5 min, so that the lower portion of the reference electrode substrate 7 is coated with a metal lithium layer 9. In this embodiment, 8 segments of the substrate material, which have no welding spots, may all be extended into the liquid lithium, and the metal lithium completely immerses the lower portion of the reference electrode substrate 7, so that the metal lithium layer 9 is grown on the lower portion of the reference electrode substrate 7. The thickness of the metal lithium layer 9 may be 10-100 µm.

In an embodiment, in step (S415), the reference electrode 2 welded with the current collector metal sheet 6 is taken out from the liquid lithium and cooled, and a lower portion of the tab-film 5 is coated with a layer of separator by a winding method, and the separator wraps the whole current collector metal sheet 6 and the whole reference electrode substrate 7 to obtain the reference electrode 2 with a separator coating. The separator may be made of porous polypropylene, porous polyethylene, porous polypropylene with a ceramic coating, polyethylene with a ceramic coating, or a non-woven fabric with a ceramic coating.

Figure 6:
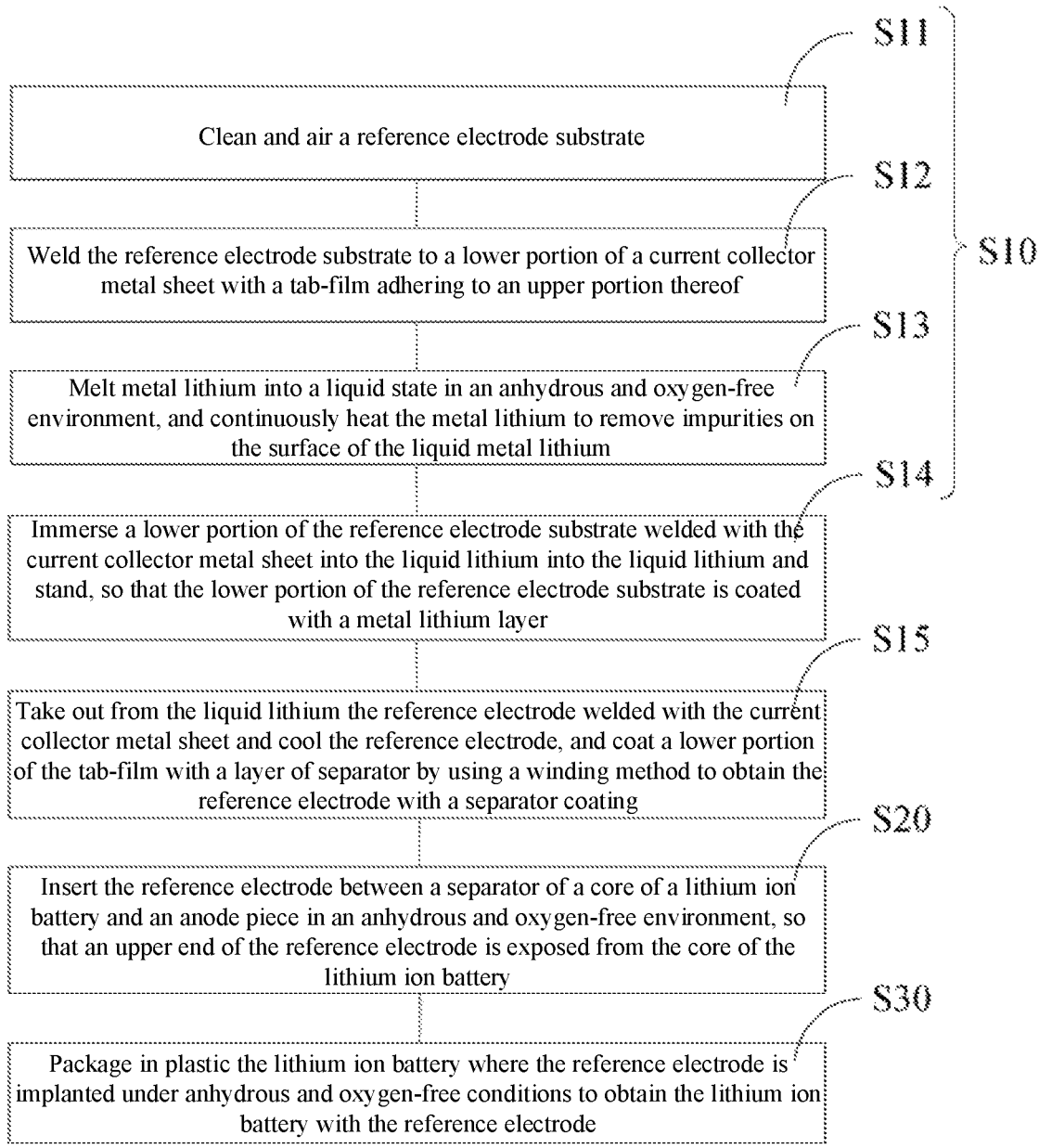
FIG. 6 shows a flow chart of a method for preparing a lithium ion battery with a reference electrode in an embodiment of the disclosure.
Figure 7:
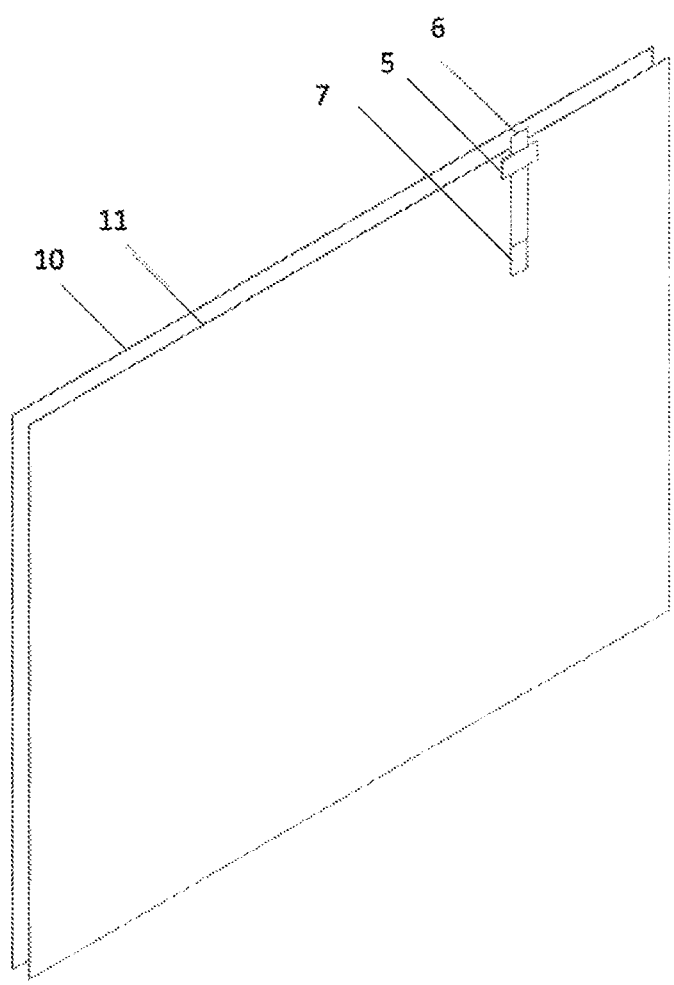
FIG. 7 shows a schematic diagram of a reference electrode inserted into a core of a lithium ion battery in an embodiment of the disclosure.

Referring to FIGS. 6-7 together, the disclosure provides a method for preparing a lithium ion battery with a reference electrode. The method for preparing a lithium ion battery with a reference electrode may include preparation of a reference electrode 2 and preparation of a lithium ion battery 1. Step (S610) of preparing the reference electrode 2 may include the following steps. (S611) Clean and air a reference electrode substrate 7. (S612) Weld the reference electrode substrate 7 to a lower portion of a current collector metal sheet 6 with a tab-film 5 adhering to an upper portion thereof (S613) Melt metal lithium into a liquid state in an anhydrous and oxygen-free environment, and continuously heat the metal lithium to remove surface impurities of the liquid metal lithium. (S614) Immerse a lower portion of the reference electrode substrate 7 welded with the current collector metal sheet 6 into the liquid lithium and stand, so that the lower portion of the reference electrode substrate 7 is coated with a metal lithium layer 9. (S615) Take out the reference electrode 2 welded with the current collector metal sheet 6 from the liquid lithium, cool the reference electrode, and coat a lower portion of the tab-film 5 with a layer of separator by a winding method to obtain the reference electrode 2 with a separator coating. The preparation of the lithium ion battery 1 with the reference electrode 2 continues, and may further include the following steps. (S620) Insert the reference electrode 2 between a separator 11 of a core of the lithium ion battery 1 and an anode piece in an anhydrous and oxygen-free environment, so that an upper end of the reference electrode 2 is exposed from the core of the lithium ion battery 1. (S630) Package in plastic the lithium ion battery 1 implanted with the reference electrode 2 under anhydrous and oxygen-free conditions to obtain the lithium ion battery 1 with the reference electrode 2.

Figure 8:
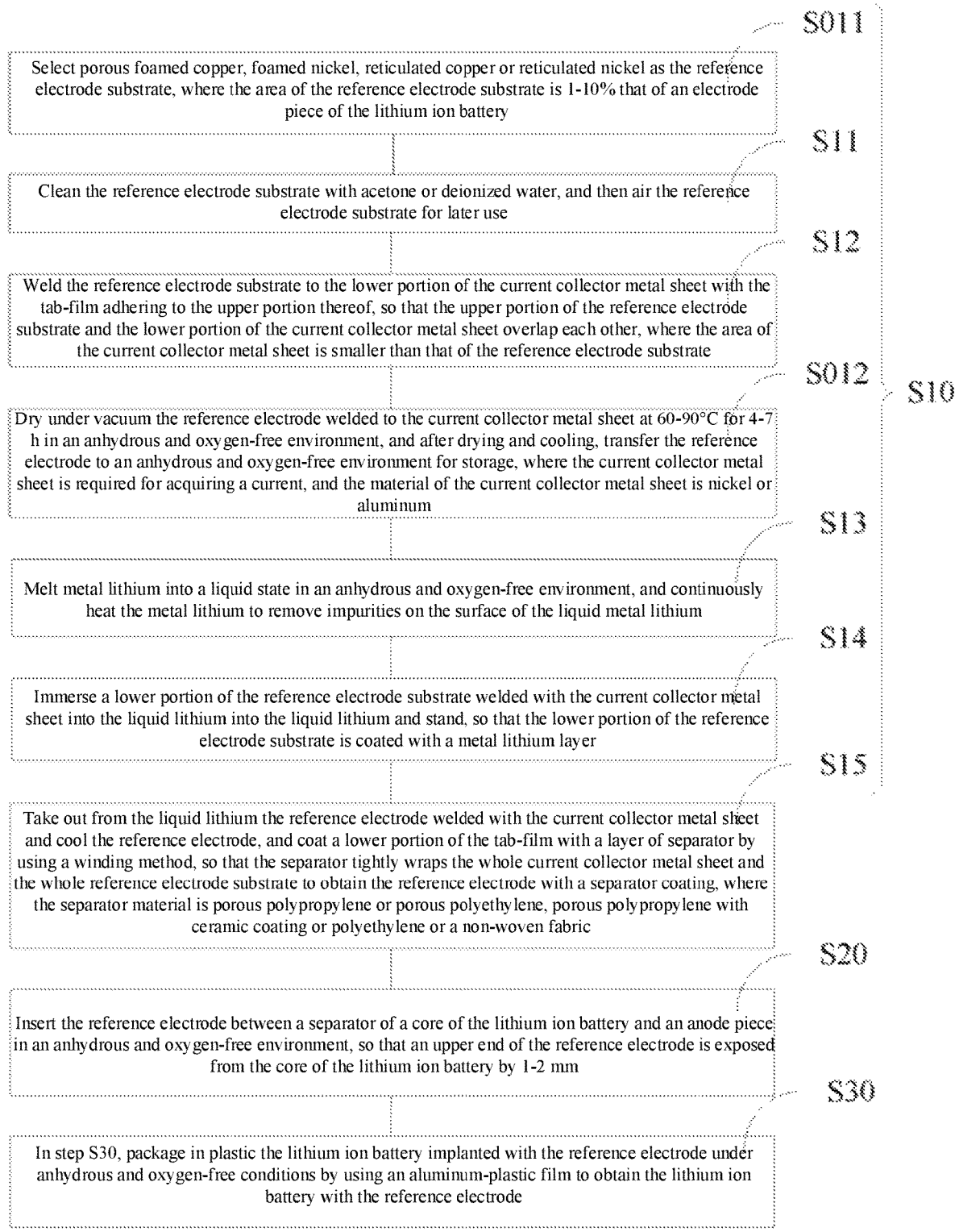
FIG. 8 shows a flow chart of another method for preparing a lithium ion battery with a reference electrode in an embodiment of the disclosure.

Referring to FIG. 8, in an embodiment, prior to step (S811), in step (S8011), porous foamed copper, foamed nickel, reticulated copper, or reticulated nickel is selected as the reference electrode substrate 7. The area of the reference electrode substrate 7 is 1%-10% that of an electrode piece of the lithium ion battery 1. In step (S811), the reference electrode substrate 7 is cleaned with acetone or deionized water, and then aired for later use. In this embodiment, the pore size of the reference electrode substrate 7 may be 50-500 µm, and the reference electrode substrate 7 may have a thickness of 0.1-1 mm.

In an embodiment, in step (S812), the reference electrode substrate 7 is welded to the lower portion of the current collector metal sheet 6 with the tab-film 5 adhering to the upper portion thereof, so that the upper portion of the reference electrode substrate 7 and the lower portion of the current collector metal sheet 6 overlap each other. The area of the current collector metal sheet 6 is smaller than that of the reference electrode substrate 7. After step (S812), in step (S8012), the reference electrode 2 welded to the current collector metal sheet 6 is dried under vacuum at 60-90° C. in an anhydrous and oxygen-free environment for 4-7 h, and after drying and cooling, the reference electrode 2 is transferred to an anhydrous and oxygen-free environment for storage. The current collector metal sheet 6 is required for acquiring a current, and the current collector metal sheet 6 is made of nickel or aluminum. In this embodiment, the current collector metal sheet 6 may have a thickness of 0.1-1 mm, and the length is determined in accordance with the position of the reference electrode 2 relative to the battery, and may be 10-30 mm.

In an embodiment, in step (S813), the metal lithium is molten into a liquid state in an anhydrous and oxygen-free environment, and continuously heated to 200-500° C. to remove surface impurities of the liquid metal lithium.

In an embodiment, in step (S814), a lower portion of the reference electrode substrate 7 with the current collector metal sheet 6 welded on an upper portion thereof is immersed into the liquid lithium and stands for 1-5 min, so that the lower portion of the reference electrode substrate 7 is coated with a metal lithium layer 9. In this embodiment, 8 segments of the substrate material, which have no welding spots, may all be extended into the liquid lithium, and the metal lithium completely immerses the lower portion of the reference electrode substrate 7, so that the metal lithium layer 9 is grown on the lower portion of the reference electrode substrate 7. The thickness of the metal lithium layer 9 may be 10-100 μm.

In an embodiment, in step (S815), the reference electrode 2 welded with the current collector metal sheet 6 is taken out from the liquid lithium and cooled, and a lower portion of the tab-film 5 is coated with a layer of separator by a winding method, and the separator wraps the whole current collector metal sheet 6 and the whole reference electrode substrate 7 to obtain the reference electrode 2 with a separator coating. The separator may be made of porous polypropylene, porous polyethylene, porous polypropylene with a ceramic coating, polyethylene with a ceramic coating, or a non-woven fabric with a ceramic coating.

In an embodiment, in step (S820), the reference electrode 2 is inserted between the separator 11 of the core of the lithium ion battery 1 and the anode piece in the anhydrous and oxygen-free environment, so that the upper end of the reference electrode 2 is exposed from the core of the lithium ion battery 1 by 1-2 mm.

In an embodiment, in step (S830), the lithium ion battery 1 implanted with the reference electrode 2 is packaged in plastic by an aluminum-plastic film under anhydrous and oxygen-free conditions to obtain the lithium ion battery 1 with the reference electrode 2.

Referring to FIG. 9, the disclosure provides a method for preparing a lithium ion battery with a reference electrode, which may include the following steps.

(S910) Prepare a reference electrode 2, with the specific process as follows: (S911) Use porous foamed copper, foamed nickel, reticulated copper, or reticulated nickel as a reference electrode substrate 7. The pore size of the reference electrode substrate 7 is 50-500 μm, and the reference electrode substrate 7 may have a thickness of is 0.1-1 mm. The area of the reference electrode substrate 7 is 1%-10% that of an electrode piece of a lithium ion battery 1. Clean the reference electrode substrate 7 with acetone or deionized water, and then air the reference electrode substrate 7 for later use.

(S912) Weld the reference electrode substrate 7 obtained in step (S911) to a lower portion of a current collector metal sheet 6 with a tab-film 5 adhering to an upper portion thereof, so that an upper portion of the reference electrode substrate 7 and the lower portion of the current collector metal sheet 6 overlap each other. Dry the reference electrode under vacuum at 60-90° C. for 4-7 h in an anhydrous and oxygen-free environment, and after drying and cooling, transfer the reference electrode to an anhydrous and oxygen-free environment for storage. The current collector metal sheet 6 is required for acquiring a current, and the current collector metal sheet 6 is made of nickel or aluminum. The thickness of the current collector metal sheet 6 is 0.1-1 mm, and the length is determined in accordance with the position of the reference electrode 2 relative to the battery, and may be 10-30 mm. The tab-film 5 on the upper portion of the current collector metal sheet 6 is configured to make the reference electrode 2 and the core of the lithium ion battery 1 relatively fixed when the reference electrode 2 is inserted in the core of the lithium ion battery 1, as shown in FIGS. 3 and 5.

(S913) Melt metal lithium into a liquid state in an anhydrous and oxygen-free environment, and continuously heat the metal lithium to 200-500° C. to remove surface impurities of the liquid metal lithium. Immerse a lower portion of the reference electrode substrate 7, for which the current collector metal sheet 6 is welded to the upper portion thereof in step (S912) into the liquid lithium and stand for 1-5 min. 8 segments of the substrate material, which have no welding spots, should all be extended into the liquid lithium, and the metal lithium completely immerses the lower portion of the reference electrode substrate 7, so that the metal lithium layer 9 is grown on the lower portion of the reference electrode substrate 7. The thickness of the metal lithium layer 9 is 10-100 μm. The reference electrode is taken out and cooled, and a lower portion of the tab-film 5 is coated with a layer of separator by a winding method, and the separator wraps the whole current collector metal sheet 6 and the whole reference electrode substrate 7 to obtain the reference electrode 2 with a separator coating. The seprator may be made of porous polypropylene, porous polyethylene, porous polypropylene with a ceramic coating, polyethylene with a ceramic coating, or a non-woven fabric with a ceramic coating. The separator used may prevent the reference electrode 2 from directly contacting the cathode 3 and the anode 4 of the lithium ion battery 1 while allowing lithium ions to pass through.

(S920) Insert the reference electrode 2 prepared in step (S910) between a separator 11 of a core of the lithium ion battery 1 and an anode piece in an anhydrous and oxygen-free environment, as shown in FIG. 7. In order to show the position of the reference electrode 2 in the core of the lithium ion battery 1, the anode piece of the lithium ion battery 1 is not shown in the figure, only the cathode piece 10 in the core of the lithium ion battery 1 is drawn, so that the upper end of the reference electrode 2 is exposed from the core of the lithium ion battery 1 by 1-2 mm.

(S930) Package in plastic the lithium ion battery 1 implanted with the reference electrode 2 in step (S920) by an aluminum-plastic film under anhydrous and oxygen-free conditions to obtain the lithium ion battery 1 with the reference electrode 2.

The following describes two manufacturing embodiments of the lithium ion battery 1 with the reference electrode 2 of the disclosure.

Embodiment 1

(S100) Prepare a reference electrode 2, with the specific process as follows:

(S110) Use porous foamed copper as a reference electrode substrate 7. The pore size of the reference electrode substrate 7 is 50 μm, and the reference electrode substrate 7 may have a thickness of is 0.2 mm. The area of the reference electrode substrate 7 is 2% that of an electrode piece of a lithium ion battery 1, and the reference electrode substrate 7 is a rectangular material piece having a length of 10 mm and a width of 5 mm. Clean the reference electrode substrate 7 with acetone or deionized water, and then air the reference electrode substrate 7 for later use.

(S120) Weld the reference electrode substrate 7 obtained in step (S110) to a lower portion of a current collector metal sheet 6 with a tab-film 5 adhering to an upper portion thereof, so that an upper portion of the reference electrode substrate 7 and the lower portion of the current collector metal sheet 6 overlap each other. In this embodiment, it is optional that a nickel current collector metal sheet 6 having the same width as the reference electrode substrate 7, a length of 20 mm, and a tab-film 5 is used for welding. Dry the reference electrode under vacuum at 80° C. for 5 h in an anhydrous and oxygen-free environment, and after cooling, transfer the reference electrode to an anhydrous and oxygen-free environment for storage.

(S130) Melt metal lithium into a liquid state in an anhydrous and oxygen-free environment, and continuously heat the metal lithium to 400° C. to remove surface impurities of the liquid metal lithium. A lower portion of the reference electrode substrate 7, for which the current collector metal sheet 6 is welded to the upper portion thereof in step (S120), is immersed into the liquid lithium and stands for 3 min. 8 segments of the substrate material, which have no welding spots, should all be extended into the liquid lithium, and the metal lithium completely immerses the lower portion of the reference electrode substrate 7, so that the lower portion of the reference electrode substrate 7 is coated with a metal lithium layer 9. The reference electrode 2 is taken out of the liquid lithium, and the surface is rapidly purged with high-temperature air at 400° C. to remove the lithium filling pores to expose the pores. The thickness of the metal lithium layer 9 grown in this embodiment is about 10 μm. The reference electrode is taken out and cooled, and a lower portion of the tab-film 5 is coated with a layer of separator by a winding method, and the separator wraps the whole current collector metal sheet 6 and the whole reference electrode substrate 7 to obtain the reference electrode 2 with a separator coating. The separator used may prevent the reference electrode 2 from directly contacting the cathode 3 and the anode 4 of the lithium ion battery 1 while allowing lithium ions to pass through.

(S200) Insert the reference electrode 2 prepared in step (S100) between a separator 11 of a core of the lithium ion battery 1 and an anode piece in an anhydrous and oxygen-free environment. In this embodiment, a Li-polymer battery is optionally used as an experimental object. The bare core of the battery is transferred into an anhydrous and oxygen-free environment, and the reference electrode 2 is implanted between the cathode piece 10 and the anode piece of the bare core, at the interface between the separator 11 and the anode piece. The reference electrode 2 may be inserted into any layer except the outermost electrode piece, and the position on the plane may be any point, which may include, but not limited to, a center, a corner, a long side, and the like, depending on specific requirements. In this embodiment, the reference electrode 2 is inserted into the middle position of the side edge of the battery, and at the same time, the upper end of the reference electrode 2 is exposed by 2 mm from the core of the lithium ion battery 1.

(S300) Package in plastic the lithium ion battery 1 implanted with the reference electrode 2 in step (S200) by an aluminum-plastic film under anhydrous and oxygen-free conditions to obtain the lithium ion battery 1 with the reference electrode 2.

Embodiment 2

(S100) Prepare a reference electrode 2, with the specific process as follows:

(S110) Use porous foamed nickel as a reference electrode substrate 7. The pore size of the reference electrode substrate 7 is 100 μm, and the reference electrode substrate 7 may have a thickness of is 0.2 mm. The area of the reference electrode substrate 7 is 5% that of an electrode piece of a lithium ion battery 1, and the reference electrode substrate 7 is a rectangular material piece having a length of 12 mm and a width of 7 mm. Clean the reference electrode substrate 7 with acetone or deionized water, and then air the reference electrode substrate 7 for later use.

(S120) Weld the reference electrode substrate 7 obtained in step (S110) to a lower portion of a current collector metal sheet 6 with a tab-film 5 adhering to an upper portion thereof, so that an upper portion of the reference electrode substrate 7 and the lower portion of the current collector metal sheet 6 overlap each other. In this embodiment, it is optional that a nickel current collector metal sheet 6 having the same width as the reference electrode substrate 7, a length of 20 mm, and a tab-film 5 is used for welding. Dry the reference electrode under vacuum at 90° C. for 5 h in an anhydrous and oxygen-free environment, and after cooling, transfer the reference electrode to an anhydrous and oxygen-free environment for storage.

(S130) Melt metal lithium into a liquid state in an anhydrous and oxygen-free environment, and continuously heat the metal lithium to 400° C. to remove surface impurities of the liquid metal lithium. A lower portion of the reference electrode substrate 7, for which the current collector metal sheet 6 is welded to the upper portion thereof in step (S120), is immersed into the liquid lithium and stands for 4 min. 8 segments of the substrate material, which have no welding spots, should all be extended into the liquid lithium, and the metal lithium completely immerses the lower portion of the reference electrode substrate 7, so that the lower portion of the reference electrode substrate 7 is coated with a metal lithium layer 9. The reference electrode 2 is taken out of the liquid lithium, and the surface is rapidly purged with high-temperature air at 400° C. to remove the lithium filling pores to expose the pores. The thickness of the metal lithium layer 9 grown in this embodiment is about 30 μm. The reference electrode is taken out and cooled, and a lower portion of the tab-film 5 is coated with a layer of separator by a winding method, and the separator wraps the whole current collector metal sheet 6 and the whole reference electrode substrate 7 to obtain a reference electrode 2 with a separator coating. The material of the separator is porous polypropylene material. The separator used may prevent the reference electrode 2 from directly contacting the cathode 3 and the anode 4 of the lithium ion battery 1 while allowing lithium ions to pass through.

(S200) Insert the reference electrode 2 prepared in step (S100) between a separator 11 of a core of the lithium ion battery 1 and an anode piece in an anhydrous and oxygen-free environment. In this embodiment, a Li-polymer battery is optionally used as an experimental object. The bare core of the battery is transferred into an anhydrous and oxygen-free environment, and the reference electrode 2 is implanted between the cathode piece 10 and the anode piece of the bare core, at the interface between the separator 11 and the anode piece. The reference electrode 2 may be inserted into any layer except the outermost electrode piece, and the position on the plane may be any point, which may include, but not limited to, a center, a corner, a long side, and the like, depending on specific requirements. In this embodiment, the reference electrode 2 is inserted into the middle position of the side edge of the battery, and at the same time, the upper end of the reference electrode 2 is exposed by 2 mm from the core of the lithium ion battery 1.

(S300) Package in plastic the lithium ion battery 1 implanted with the reference electrode 2 in step (S200) by an aluminum-plastic film under anhydrous and oxygen-free conditions to obtain the lithium ion battery 1 with the reference electrode 2.

Embodiment 3

(S100) Prepare a reference electrode 2, with the specific process as follows:

(S110) Use porous reticulated copper as a reference electrode substrate 7. The pore size of the reference electrode substrate 7 is 300 and the reference electrode substrate 7 may have a thickness of is 0.2 mm. The area of the reference electrode substrate 7 is 2% that of an electrode piece of a lithium ion battery 1, and the reference electrode substrate 7 is a rectangular material piece having a length of 20 mm and a width of 10 mm. Clean the reference electrode substrate 7 with acetone or deionized water, and then air the reference electrode substrate 7 for later use.

(S120) Weld the reference electrode substrate 7 obtained in step (S110) to a lower portion of a current collector metal sheet 6 with a tab-film 5 adhering to an upper portion thereof, so that an upper portion of the reference electrode substrate 7 and the lower portion of the current collector metal sheet 6 overlap each other. In this embodiment, it is optional that a nickel current collector metal sheet 6 having the same width as the reference electrode substrate 7, a length of 20 mm, and a tab-film 5 is used for welding. Dry the reference electrode under vacuum at 80° C. for 5 h in an anhydrous and oxygen-free environment, and after cooling, transfer the reference electrode to an anhydrous and oxygen-free environment for storage.

(S130) Melt metal lithium into a liquid state in an anhydrous and oxygen-free environment, and continuously heat the metal lithium to 400° C. to remove surface impurities of the liquid metal lithium. A lower portion of the reference electrode substrate 7, for which the current collector metal sheet 6 is welded to the upper portion thereof in step (S120), is immersed into the liquid lithium and stands for 3 min. 8 segments of the substrate material, which have no welding spots, should all be extended into the liquid lithium, and the metal lithium completely immerses the lower portion of the reference electrode substrate 7, so that the lower portion of the reference electrode substrate 7 is coated with a metal lithium layer 9. The reference electrode 2 is taken out of the liquid lithium, and the surface is rapidly purged with high-temperature air at 400° C. to remove the lithium filling pores to expose the pores. The thickness of the metal lithium layer 9 grown in this embodiment is about 100 µm. The reference electrode is taken out and cooled, and a lower portion of the tab-film 5 is coated with a layer of separator by a winding method, and the separator wraps the whole current collector metal sheet 6 and the whole reference electrode substrate 7 to obtain the reference electrode 2 with a separator coating. The material of the separator is porous polypropylene material. The separator used may prevent the reference electrode 2 from directly contacting the cathode 3 and the anode 4 of the lithium ion battery 1 while allowing lithium ions to pass through.

(S200) Insert the reference electrode 2 prepared in step (S100) between a separator 11 of a core of the lithium ion battery 1 and an anode piece in an anhydrous and oxygen-free environment. In this embodiment, a Li-polymer battery is optionally used as an experimental object. The bare core of the battery is transferred into an anhydrous and oxygen-free environment, and the reference electrode 2 is implanted between the cathode piece 10 and the anode piece of the bare core, at the interface between the separator 11 and the anode piece. The reference electrode 2 may be inserted into any layer except the outermost electrode piece, and the position on the plane may be any point, which may include, but not limited to, a center, a corner, a long side, and the like, depending on specific requirements. In this embodiment, the reference electrode 2 is inserted into the middle position of the side edge of the battery, and at the same time, the upper end of the reference electrode 2 is exposed by 2 mm from the core of the lithium ion battery 1.

(S300) Package in plastic the lithium ion battery 1 implanted with the reference electrode 2 in step (S200) by an aluminum-plastic film under anhydrous and oxygen-free conditions to obtain the lithium ion battery 1 with the reference electrode 2.

Embodiment 4

(S100) Prepare a reference electrode 2, with the specific process as follows:

(S110) Use porous reticulated nickel as a reference electrode substrate 7. The pore size of the reference electrode substrate 7 is 500 µm, and the reference electrode substrate 7 may have a thickness of is 0.2 mm. The area of the reference electrode substrate 7 is 1% that of an electrode piece of a lithium ion battery 1, and the reference electrode substrate 7 is a rectangular material piece having a length of 20 mm and a width of 8 mm. Clean the reference electrode substrate 7 with acetone or deionized water, and then air the reference electrode substrate 7 for later use.

(S120) Weld the reference electrode substrate 7 obtained in step (S110) to a lower portion of a current collector metal sheet 6 with a tab-film 5 adhering to an upper portion thereof, so that an upper portion of the reference electrode substrate 7 and the lower portion of the current collector metal sheet 6 overlap each other. In this embodiment, it is optional that a nickel current collector metal sheet 6 having the same width as the reference electrode substrate 7, a length of 20 mm, and a tab-film 5 is used for welding. Dry the reference electrode under vacuum at 80° C. for 5 h in an anhydrous and oxygen-free environment, and after cooling, transfer the reference electrode to an anhydrous and oxygen-free environment for storage.

(S130) Melt metal lithium into a liquid state in an anhydrous and oxygen-free environment, and continuously heat the metal lithium to 400° C. to remove surface impurities of the liquid metal lithium. A lower portion of the reference electrode substrate 7, for which the current collector metal sheet 6 is welded to the upper portion thereof in step (S120), is immersed into the liquid lithium and stands for 3 min. 8 segments of the substrate material, which have no welding spots, should all be extended into the liquid lithium, and the metal lithium completely immerses the lower portion of the reference electrode substrate 7, so that the lower portion of the reference electrode substrate 7 is coated with a metal lithium layer 9. The reference electrode 2 is taken out of the liquid lithium, and the surface is rapidly purged with high-temperature air at 400° C. to remove the lithium filling pores to expose the pores. The thickness of the metal lithium layer 9 grown in this embodiment is about 100 µm. The reference electrode is taken out and cooled, and a lower portion of the tab-film 5 is coated with a layer of separator by a winding method, and the separator wraps the whole current collector metal sheet 6 and the whole reference electrode substrate 7 to obtain a reference electrode 2 with a separator coating. The material of the separator is porous polypropylene material. The separator used may prevent the reference electrode 2 from directly contacting the cathode 3 and the anode 4 of the lithium ion battery 1 while allowing lithium ions to pass through.

(S200) Insert the reference electrode 2 prepared in step (S100) between a separator 11 of a core of the lithium ion battery 1 and an anode piece in an anhydrous and oxygen-free environment. In this embodiment, a Li-polymer battery is optionally used as an experimental object. The bare core of the battery is transferred into an anhydrous and oxygen-free environment, and the reference electrode 2 is implanted between the cathode piece 10 and the anode piece of the bare core, at the interface between the separator 11 and the anode piece. The reference electrode 2 may be inserted into any layer except the outermost electrode piece, and the position on the plane may be any point, which may include, but not limited to, a center, a corner, a long side, and the like, depending on specific requirements. In this embodiment, the reference electrode 2 is inserted into the middle position of the side edge of the battery, and at the same time, the upper end of the reference electrode 2 is exposed by 2 mm from the core of the lithium ion battery 1.

(S300) Package in plastic the lithium ion battery 1 implanted with the reference electrode 2 in step (S200) by an aluminum-plastic film under anhydrous and oxygen-free conditions to obtain the lithium ion battery 1 with the reference electrode 2.

Figure 10:
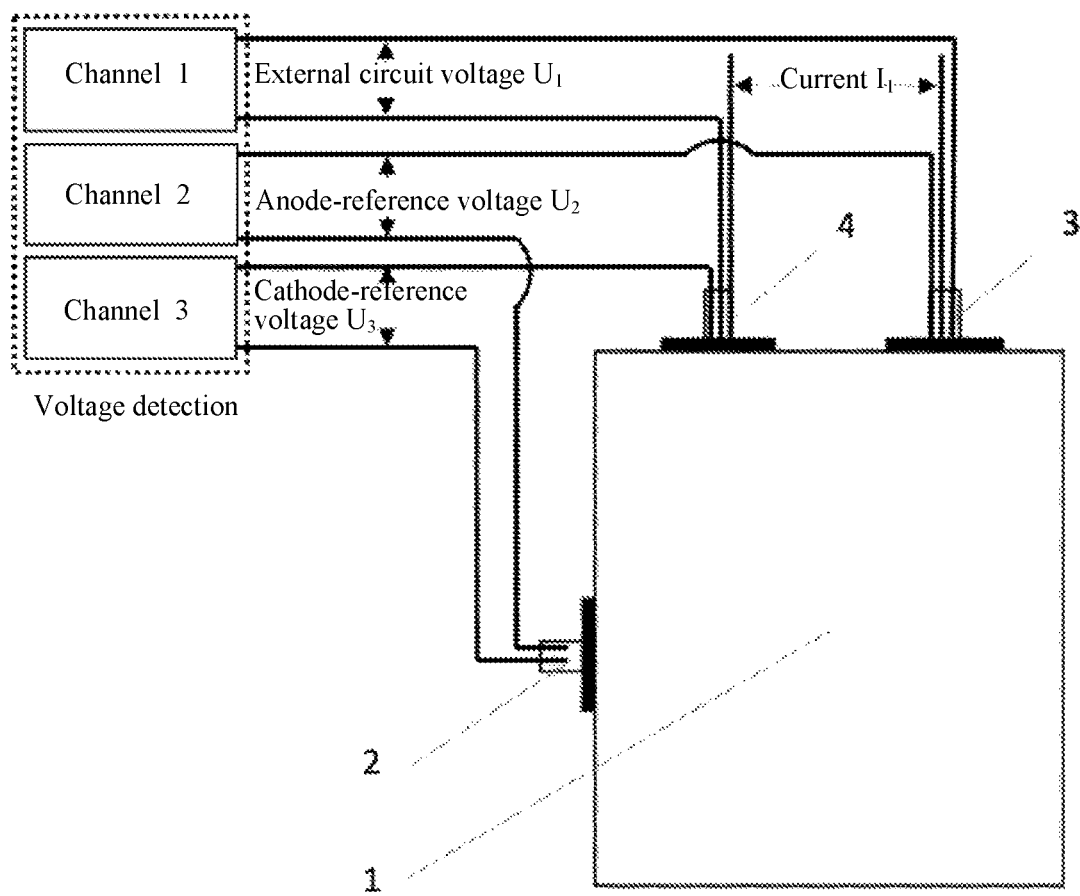
FIG. 10 shows a schematic connection diagram of a measuring circuit of a lithium ion battery with a reference electrode in an embodiment of the disclosure.

Charging and discharging testers or other current sources or other devices are adopted to respectively the cathode 3 and the anode 4 of the lithium ion battery 1 with the reference electrode 2 to carry out charging and discharging tests. The performance of the lithium ion battery 1 in an assembled measuring device with the reference electrode 2 is detected. A connection diagram of a measuring circuit is shown in FIG. 10: through three test channels of a high input impedance synchronous voltage acquisition device, detection and recording are performed on an external circuit voltage U1 of the lithium ion battery 1 with the reference electrode 2 by the first channel, performed on an anode-reference voltage U2 by the second channel, and performed on a cathode-reference voltage U3 by the third channel. At the same time, various charge and discharge cycle tests are carried out on the lithium ion batteries 1 with the reference electrode 2 by the first channel. Upper and lower cut-off voltages are set to 4.2 V and 2.5 V respectively, and the current magnitude during charge and discharge is recorded at the same time. The following is an analysis of results of two different charge and discharge cycle tests.

Figure 11:
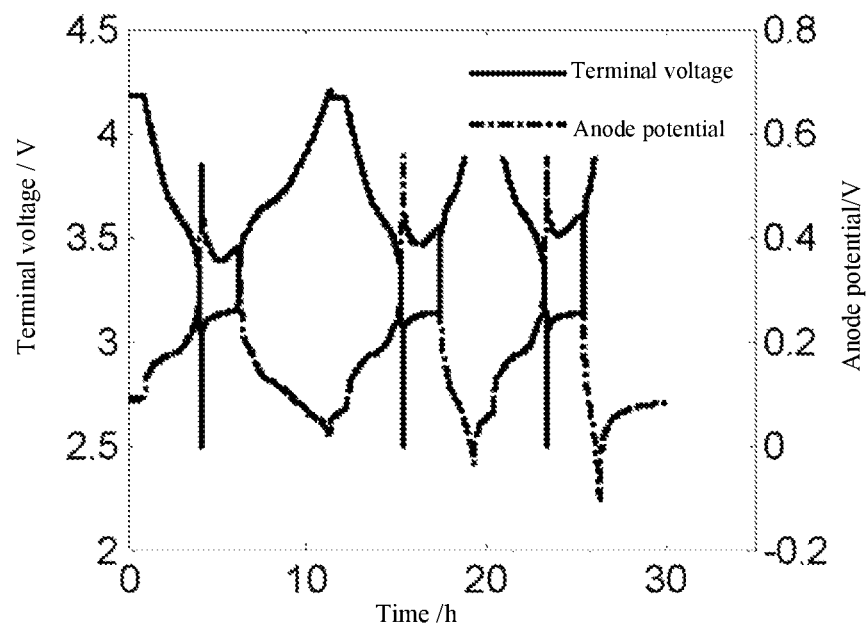
FIG. 11 shows a rate test result diagram of a lithium ion battery with a reference electrode in an embodiment of the disclosure.

FIG. 11 is a charge/discharge rate test diagram of a lithium ion battery with a reference electrode 2. In this figure, the horizontal axis denotes test time and the vertical axis denotes a test voltage. A solid line denotes an external circuit voltage of the battery, and a dashed line denotes a single electrode of an anode 4 measured by the reference electrode 2 in the battery. In the test, the charge/discharge rate gradually increased from 0.5 C to 1.5 C, with the first charge/discharge cycle using 0.5 C charge/discharge, the second charge/discharge cycle using 1 C charge/discharge, and the third charge/discharge cycle using 1.5 C charge/discharge, as shown in the figure. According to this test, it may be found that when the charge/discharge rate changed, the voltage variation amplitude of the external circuit was consistent under the three different charge/discharge cycles, while the voltage variation amplitude of the anode 4 measured by the reference electrode 2 had a significant increasing trend under the gradually increased charge/discharge rate. The characteristic that the voltage of the anode 4 changes with the change of the charge/discharge rate cannot be measured only by measuring the voltage of the external circuit, and the voltage change characteristic of the single electrode may be visually and simply measured by the reference electrode 2, so that the advantage of testing by the reference electrode 2 may be embodied.

Figure 12:
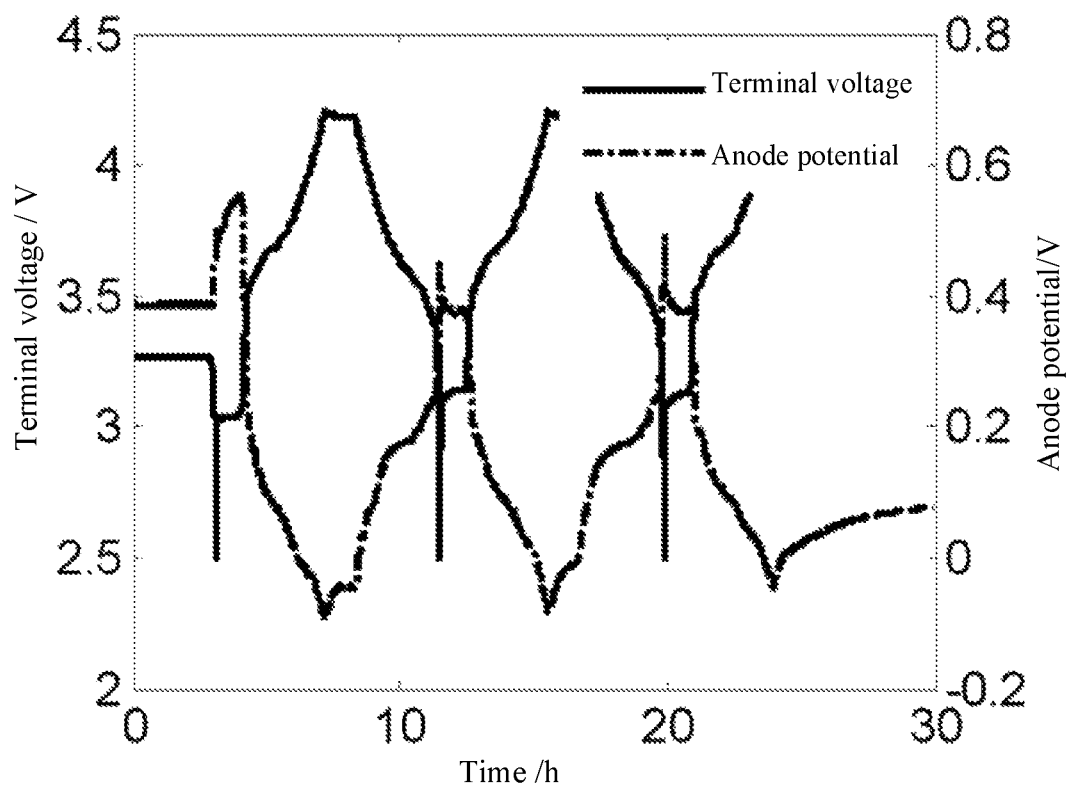
FIG. 12 shows a capacity test result diagram of a lithium ion battery with a reference electrode in an embodiment of the disclosure.

FIG. 12 is a capacity test result diagram of a battery with a reference electrode 2. In this figure, the horizontal axis denotes test time and the vertical axis denotes a test voltage. A solid line denotes an external circuit voltage of the battery, and a dashed line denotes a single electrode of an anode 4 measured by the reference electrode 2 in the battery. In the test, the charge/discharge rate was maintained at 1 C. It may be seen that a single motor voltage of the anode 4 was stable in each charge/discharge cycle relative to the reference electrode, while the overall voltage of the battery was stable in each charge/discharge cycle, indicating that the reference electrode 2 had a better service life within the range required by the test, and the reference electrode 2 did not interfere with the operation of the battery.

Various embodiments of the disclosure may have one or more of the following effects. The disclosure may provide a reference electrode and a method for preparing a lithium ion battery with a reference electrode. In some embodiments, the porous characteristic of the substrate material may be retained while the metal lithium is grown on the surface of the substrate material, so that small molecules in electrolyte may penetrate through pores without affecting the operation of the battery. In other embodiments, by controlling process parameters in the preparation process, the growth thickness of the lithium layer on the substrate may be controlled to ensure that the porous property of the substrate material is retained. In further embodiments, enough lithium is loaded on the material to meet the testing requirements. The disclosure may provide a reference electrode having a long service life on the premise of ensuring a sufficient microstructure. The reference electrode may be made by a simple preparation process, meet industrial production requirements, and help to enable an industrial production and application of the lithium ion battery with the reference electrode. In other embodiments, the disclosure may provide a method for preparing a reference electrode and a lithium ion battery with a reference electrode, which may help to solve the instability in measurement of the reference electrode, improve the service life of the reference electrode, achieve long-time single-electrode potential measurement with multiple cycles, and improve the accuracy of measurement results.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Unless indicated otherwise, not all steps listed in the various figures need be carried out in the specific order described.

What is claimed is:

1. A method for preparing a reference electrode, comprising the steps of:
    (S11) cleaning and drying a reference electrode substrate (7);
    (S12) welding the reference electrode substrate (7) to a lower portion of a current collector metal sheet (6) with a tab-film (5) adhering to an upper portion thereof;
    (S13) melting metal lithium into a liquid state in an anhydrous and oxygen-free environment, and continuously heating the liquid metal lithium to remove surface impurities;
    (S14) immersing a lower portion of the reference electrode substrate (7) welded with the current collector metal sheet (6) into the liquid lithium and keeping the reference electrode substrate (7) standing, so that the lower portion of the reference electrode substrate (7) is coated with a metal lithium layer (9); and
    (S15) taking out the reference electrode (2) welded with the current collector metal sheet (6) from the liquid lithium, purging a surface of the reference electrode (2) with air at 400° C. to remove lithium filled in pores to expose the pores, cooling the reference electrode (2), and coating a lower portion of the tab-film (5) with a layer of separator by a winding method to obtain a reference electrode (2) with a separator coating.

2. The method according to claim 1, wherein before step (S11), the method further comprises (S011) selecting porous foamed copper, foamed nickel, reticulated copper, or reticulated nickel as the reference electrode substrate (7).

3. The method according to claim 1, wherein in step (S11), the reference electrode substrate (7) is cleaned with acetone or deionized water, and then aired for later use.

4. The method according to claim 1, wherein in step (S12):
    the reference electrode substrate (7) is welded to the lower portion of the current collector metal sheet (6) with the tab-film (5) adhering to the upper portion thereof, so that the upper portion of the reference electrode substrate (7) and the lower portion of the current collector metal sheet (6) overlap each other; and
    an area of the current collector metal sheet (6) is smaller than that of the reference electrode substrate (7).

5. The method according to claim 1, wherein after step (S12), the method further comprises:
    (S012) drying under vacuum the reference electrode (2) welded to the current collector metal sheet (6) at 60-90° C. in an anhydrous and oxygen-free environment for 4-7 h and transferring the reference electrode (2) to an anhydrous and oxygen-free environment for storage after drying and cooling,
    wherein the current collector metal sheet (6) is required for acquiring a current, and the current collector metal sheet (6) is made of nickel or aluminum.

6. The method according to claim 1, wherein in step (S13):
    the metal lithium is molten into a liquid state in an anhydrous and oxygen-free environment; and
    the liquid metal lithium is continuously heated to 200-500° C. to remove surface impurities.

7. The method according to claim 1, wherein in step (S14), a lower portion of the reference electrode substrate (7) with the current collector metal sheet (6) welded on an upper portion thereof is immersed into the liquid lithium and stands for 1-5 min, so that the lower portion of the reference electrode substrate (7) is coated with the metal lithium layer (9).

8. The method according to claim 1, wherein in step (S15):
    the reference electrode (2) welded with the current collector metal sheet (6) is taken out from the liquid lithium and cooled;
    a lower portion of the tab-film (5) is coated with a layer of separator by a winding method;
    the separator wraps the whole current collector metal sheet (6) and the whole reference electrode substrate (7) to obtain the reference electrode (2) with a separator coating; and
    the separator is made of porous polypropylene, porous polyethylene, porous polypropylene with a ceramic coating, polyethylene with a ceramic coating, or a non-woven fabric with a ceramic coating.

9. A method for preparing a lithium ion battery with a reference electrode, comprising the steps of:
    (S10) preparing a reference electrode (2), comprising:
        (S11) cleaning and drying a reference electrode substrate (7);
        (S12) welding the reference electrode substrate (7) to a lower portion of a current collector metal sheet (6) with a tab-film (5) adhering to an upper portion thereof;
        (S13) melting metal lithium into a liquid state in an anhydrous and oxygen-free environment, and continuously heating the liquid metal lithium to remove surface impurities;
        (S14) immersing a lower portion of the reference electrode substrate (7) welded with the current collector metal sheet (6) into the liquid lithium and keeping the reference electrode substrate (7) standing, so that the lower portion of the reference electrode substrate (7) is coated with a metal lithium layer (9); and
        (S15) taking the reference electrode (2) welded with the current collector metal sheet (6) out from the liquid lithium, purging a surface of the reference electrode (2) with air at 400° C. to remove lithium filled in pores to expose the pores, cooling the reference electrode (2), and coating a lower portion of the tab-film (5) with a layer of separator by a winding method to obtain the reference electrode (2) with a separator coating;
    (S20) inserting the reference electrode (2) between a separator (11) of a core of a lithium ion battery (1) and an anode piece in an anhydrous and oxygen-free environment, so that an upper end of the reference electrode (2) is exposed from the core of the lithium ion battery (1); and
    (S30) packaging in plastic the lithium ion battery (1) implanted with the reference electrode (2) under anhydrous and oxygen-free conditions to obtain the lithium ion battery (1) with the reference electrode (2).

10. The method according to claim 9, wherein before step (S11):
    the method further comprises (S011) selecting porous foamed copper, foamed nickel, reticulated copper, or reticulated nickel as the reference electrode substrate (7); and
    an area of the reference electrode substrate (7) is 1-10% that of an electrode piece of the lithium ion battery (1).

11. The method according to claim 9, wherein in step (S11), the reference electrode substrate (7) is cleaned with acetone or deionized water, and then aired for later use.

12. The method according to claim 9, wherein in step (S12):

the reference electrode substrate (7) is welded to the lower portion of the current collector metal sheet (6) with the tab-film (5) adhering to the upper portion thereof, so that the upper portion of the reference electrode substrate (7) and the lower portion of the current collector metal sheet (6) overlap each other; and an area of the current collector metal sheet (6) is smaller than that of the reference electrode substrate (7).

13. The method according to claim 9, wherein after step (S12), the method further comprises:
(S012) drying under vacuum the reference electrode (2) welded to the current collector metal sheet (6) at 60-90° C. in an anhydrous and oxygen-free environment for 4-7 h and transferring the reference electrode (2) to an anhydrous and oxygen-free environment for storage after drying and cooling,
wherein the current collector metal sheet (6) is required for acquiring a current, and the current collector metal sheet (6) is made of nickel or aluminum.

14. The method according to claim 9, wherein in step (S13):
the metal lithium is molten into a liquid state in an anhydrous and oxygen-free environment; and
the liquid metal lithium is continuously heated to 200-500° C. to remove surface impurities.

15. The method according to claim 9, wherein in step (S14), a lower portion of the reference electrode substrate (7) with the current collector metal sheet (6) welded on an upper portion thereof is immersed into the liquid lithium and stands for 1-5 min, so that the lower portion of the reference electrode substrate (7) is coated with the metal lithium layer (9).

16. The method according to claim 9, wherein in step (S15):
the reference electrode (2) welded with the current collector metal sheet (6) is taken out from the liquid lithium and cooled;
a lower portion of the tab-film (5) is coated with a layer of separator by a winding method;
the separator wraps the whole current collector metal sheet (6) and the whole reference electrode substrate (7) to obtain the reference electrode (2) with a separator coating; and
the separator is made of porous polypropylene, porous polyethylene, porous polypropylene with a ceramic coating, polyethylene with a ceramic coating, or a non-woven fabric with a ceramic coating.

17. The method according to claim 9, wherein in step (S20), the reference electrode (2) is inserted between the separator (11) of the core of the lithium ion battery (1) and the anode piece in the anhydrous and oxygen-free environment, so that the upper end of the reference electrode (2) is exposed from the core of the lithium ion battery (1) by 1-2 mm.

18. The method according to claim 9, wherein in step (S30), the lithium ion battery (1) implanted with the reference electrode (2) is packaged in plastic by an aluminum-plastic film under anhydrous and oxygen-free conditions to obtain the lithium ion battery (1) with the reference electrode (2).

19. A method for preparing a lithium ion battery with a reference electrode, comprising the steps of:
(S100) preparing a reference electrode (2), specifically comprising:
(S110) using porous foamed copper, foamed nickel, reticulated copper, or reticulated nickel as a reference electrode substrate (7), wherein the reference electrode substrate material has an aperture of 50-500 μm, the reference electrode substrate (7) has a thickness of 0.1-1 mm, and an area of the reference electrode substrate (7) is 1-10% that of an electrode piece of a lithium ion battery (1); cleaning the reference electrode substrate (7) with acetone or deionized water; and then airing the reference electrode substrate for later use;

(S120) welding the reference electrode substrate (7) obtained in step (S110) to a lower portion of a current collector metal sheet (6) with a tab-film (5) adhering to an upper portion thereof, so that an upper portion of the reference electrode substrate (7) and the lower portion of the current collector metal sheet (6) overlap each other, wherein an area of the current collector metal sheet (6) is smaller than that of the reference electrode substrate, drying the reference electrode under vacuum at 60-90° C. for 4-7 h in an anhydrous and oxygen-free environment, and after drying and cooling, transferring the reference electrode to an anhydrous and oxygen-free environment for storage, wherein the current collector metal sheet (6) is required for acquiring a current, the current collector metal sheet (6) is made of nickel or aluminum, and the current collector metal sheet (6) has a thickness of 0.1-1 mm and a length of 10-30 mm;

(S130) melting metal lithium into a liquid state in an anhydrous and oxygen-free environment, and continuously heating the metal lithium to 200-500° C. to remove surface impurities of the liquid metal lithium; immersing a lower portion of the reference electrode substrate (7), for which the current collector metal sheet (6) is welded to the upper portion thereof in step (S120) into the liquid lithium and keeping the reference electrode substrate (7) standing for 1-5 min, so that the lower portion of the reference electrode substrate (7) is coated with a metal lithium layer (9), wherein the metal lithium layer (9) has a thickness of 10-100 μm; taking out the reference electrode (2), purging a surface of the reference electrode (2) with air at 400° C. to remove lithium filled in pores to expose the pores, and cooling the reference electrode (2), and coating a lower portion of the tab-film (5) with a layer of separator by a winding method to wrap the current collector metal sheet (6) and the reference electrode substrate (7) to obtain the reference electrode (2) with a separator coating, wherein the separator is made of porous polypropylene, porous polyethylene, porous polypropylene with a ceramic coating, polyethylene with a ceramic coating, or a non-woven fabric with a ceramic coating;

(S200) inserting the reference electrode (2) prepared in step (S100) between a separator (11) of a core of the lithium ion battery (1) and an anode piece in an anhydrous and oxygen-free environment, so that the upper end of the reference electrode (2) is exposed from the core of the lithium ion battery (1) by 1-2 mm; and (S300) packaging in plastic the lithium ion battery (1) implanted with the reference electrode (2) in step (S200) by an aluminum-plastic film under anhydrous and oxygen-free conditions to obtain the lithium ion battery (1) with the reference electrode (2).

* * * * *